United States Patent [19]

Deininger et al.

[11] Patent Number: 5,046,926
[45] Date of Patent: Sep. 10, 1991

[54] CONTROL DEVICE FOR A VARIABLE DISPLACEMENT HYDROSTATIC MACHINE

[75] Inventors: Horst Deininger, Hoerstein/Alzenau; Gustav Kleineisel, Mainaschaff; Rudolf Richter, Hoesbach, all of Fed. Rep. of Germany

[73] Assignee: Linde Aktiengesellschaft, Fed. Rep. of Germany

[21] Appl. No.: 559,298

[22] Filed: Jul. 30, 1990

[30] Foreign Application Priority Data

Jul. 31, 1989 [DE] Fed. Rep. of Germany ....... 3925297

[51] Int. Cl.⁵ .......................................... F04B 49/08
[52] U.S. Cl. ..................................... 417/216; 60/452; 417/218
[58] Field of Search ............... 417/217, 216, 218, 221, 417/222, 282, 291; 60/452

[56] References Cited

U.S. PATENT DOCUMENTS

| | | | |
|---|---|---|---|
| 3,846,982 | 11/1974 | Rometsch et al. | 60/445 |
| 4,094,144 | 6/1978 | Italy | 60/452 |
| 4,292,805 | 10/1981 | Acheson | 60/452 |
| 4,408,453 | 10/1983 | Westveer | 417/218 |
| 4,543,787 | 10/1985 | Eckhardt | 60/452 |
| 4,559,779 | 12/1985 | Krusche | 60/452 |
| 4,810,171 | 3/1989 | Krebs | 417/218 |

FOREIGN PATENT DOCUMENTS

| | | | |
|---|---|---|---|
| 2363980 | 5/1973 | Fed. Rep. of Germany | 417/219 |
| 2231421 | 1/1974 | Fed. Rep. of Germany | |

Primary Examiner—Richard A. Bertsch
Assistant Examiner—Peter Korytnyk
Attorney, Agent, or Firm—Webb, Burden, Ziesenheim & Webb

[57] ABSTRACT

A control device for a variable displacement hydrostatic machine having a stroke-volume regulator which is responsive to an actuating pressure. The control device includes a booster pump. The delivery pressure of the machine is the actuating pressure unless the delivery pressure of the machine is insufficient in which case the actuating pressure is a feed pressure produced by the booster pump. The control device includes a plurality of delivery-pressure lines and a proportioning pressure regulator having an outlet pressure which is proportionally reduced relative to the intake pressure connected between each delivery-pressure line and the stroke-volume regulator.

15 Claims, 2 Drawing Sheets 5,046,926

CONTROL DEVICE FOR A VARIABLE DISPLACEMENT HYDROSTATIC MACHINE

BACKGROUND OF THE INVENTION

1. Field of the Invention

The invention relates to a control device for a variable displacement hydrostatic machine having a stroke-volume regulator to which an actuating pressure can be applied. The actuating pressure is the delivery pressure of the machine and, if the delivery pressure of the machine is insufficient, a pressure produced by a booster pump is the actuating pressure.

2. Description of Related Prior Art

U.S. Pat. No. 3,846,982 describes a hydrostatic drive for a vehicle in the form of a hydraulic pump having an adjustable stroke-volume. The adjustment of the stroke-volume is accomplished by an actuating pressure which, in the neutral position of the hydraulic pump, is produced by an auxiliary pump, which at the same time is the feed pump for a closed hydrostatic cycle so that the auxiliary pump always feeds into the delivery-pressure line carrying the lower pressure. When the hydraulic pump is not in the neutral position, the pressure in the high-pressure cycle of the machine is used as the actuating pressure.

A disadvantage of using the high-pressure cycle of the machine as the actuating pressure is that the high pressure creates large forces which have to be absorbed at limit stops in the stroke-volume control. In addition, the regulating forces and the regulating times vary greatly because of the large pressure differential between the minimum actuating pressure, i.e., the feed pressure, and the maximum actuating pressure, i.e., the highest pressure in the delivery line of the pump. If the high pressure is used for other control purposes, for example, to cut off pressure or to limit output, numerous lines are generally required to pass the high pressure to the control system.

To avoid these problems, it is known to provide low-pressure regulation instead of high-pressure regulation. However, low-pressure regulation has the disadvantage that large pistons are required to produce the regulating force, so that the machine must be relatively large.

SUMMARY OF THE INVENTION

The present invention avoids the above-mentioned disadvantages and provides a control which supplies the stroke-volume regulator with a pressure which is higher than the feed pressure and lower than the full high pressure. The invention utilizes a proportioning pressure regulator whose outlet pressure is proportionally reduced in relation to the intake pressure connected between a delivery-pressure line to the machine and the control. Therefore, an actuating pressure is provided to supply the stroke-volume control and for control purposes. However, at least the feed pressure is proportionally reduced relative to the high pressure in the delivery-pressure line.

It is advantageous if the proportioning pressure regulator has a first control surface which is effective in a direction to reduce the intake pressure to which outlet pressure can be applied and has second and third control surfaces effective in the opposite direction to which feed pressure and delivery pressure are applied. The actuating pressure is determined by the sum of the feed pressure plus the product obtained from the delivery pressure and the area ratio between the third and first control surfaces. If the pump is in a neutral position so that no high pressure is present as delivery pressure at the proportioning pressure regulator and only feed pressure is present, the control fluid under the feed pressure can freely pass through the proportioning pressure regulator so that the control pressure at the stroke-volume control will correspond to the feed pressure.

According to a modification of the invention, a control device with a regulating device in the form of a servo follower and having a relay valve actuated by control pressure at which the actuating pressure is present, provides that the control pressure is present at a two-way spring-loaded valve connected in parallel with the relay valve and having an open position and a closed position. The two-way valve has a control surface opposite to the direction of the spring tension to which an actuating pressure can be applied. If the actuating pressure is sufficient, the two-way valve opens to a tank. Thus, the actuating pressure serves as a measurement for the prevailing high pressure and controls a pressure cut-off valve that prevents the increase of the high pressure. In this arrangement, the high pressure is not supplied to the pressure cut-off valve which results in a control expenditure reduction.

In another modification of the invention, a pressure-relief valve is provided downstream of the two-way valve. A valve system of this type limits the output of the machine. It is also possible to connect a pressure cut-off device in parallel with an output limiter.

It is advantageous for a control mechanism for a hydrostatic machine located in a closed cycle and having two directions of flow if an actuating pressure line branches off each feed line and a proportioning pressure regulator is provided in each actuating pressure line. It is also advantageous if the control pressure lines are connected to a changeover valve that has a line leading to the regulating device. In this arrangement, both high-pressure ends of the machine are being used, and an actuating pressure proportional to the high pressure is available from each high-pressure end. The proportioning pressure regulators only discharge down to feed pressure, and therefore, the actuating pressure never falls below the level of the feed pressure. If a machine equipped with a control of this type is employed in a hydrostatic transmission designed as a travel drive unit, it is possible to avoid undesirable effects during vehicle braking by linking the actuating pressure with the respective active regulating-pressure end at the relay valve.

In a further modification of the invention a control for a hydrostatic pump has a line leading to a stroke-volume control of a hydrostatic engine branching off downstream of the changeover valve. Therefore, the control can also be used to regulate and control variable displacement engines in primary-secondary control systems.

A hydrostatic axial piston machine with a control according to the invention has a particularly compact design if the proportioning pressure regulators are located within the housing of the axial piston machine. In such an arrangement it is merely necessary to provide two high-pressure channels in the housing leading to the proportioning pressure regulators. It is also possible to feed the actuating pressure to a delivery device.

The features which characterize the invention are pointed out with particularity in the claims annexed to and forming a part of this disclosure. For a better understanding of the invention, its operating advantages and the specific objects attained by its use, reference should be had to the accompanying drawings and descriptive matter in which a preferred embodiment of the invention is illustrated and described. Like reference characters describe like parts through out the drawings.

DESCRIPTION OF THE PREFERRED EMBODIMENT

Figure 1:
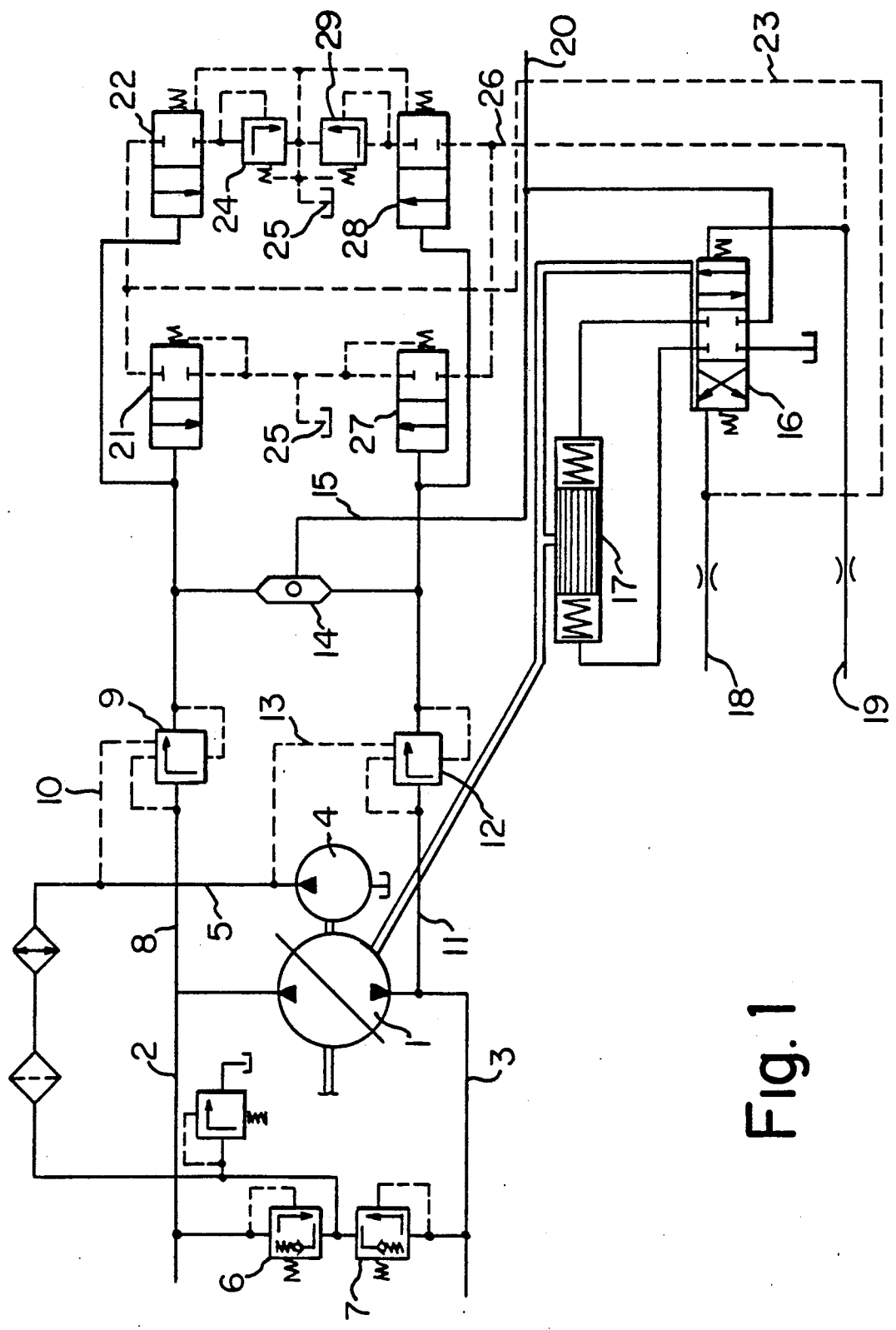
FIG. 1 is a circuit diagram according to the invention for controlling a variable displacement hydrostatic machine.

With reference to FIG. of the drawings, a pump 1 having two directions of flow is connected by delivery-pressure lines 2 and 3 to a hydrostatic motor (not shown) in a closed circuit. A booster pump 4 is connected to and driven in rotational synchronization with pump 1. The booster pump supplies hydraulic fluid through a feed pressure line 5 and feed units 6 and 7 to delivery-pressure lines 2 and 3. Each feed unit 6 and 7 is a combination of a check valve and a pressure-relief valve. A line 8 branches off from delivery-pressure line 2 and leads to a proportioning pressure regulator 9. The proportioning pressure regulator 9 has control surfaces which are in the direction of flow of the feed pressure from a line 10 which branches off line 5 and of the delivery pressure from line 8. The outlet pressure acts on an opposing control surface.

A line 11 leads from delivery-pressure line 3 to a proportioning pressure regulator 12. The proportioning pressure regulator 12 has control surfaces which are in the direction flow of the feed pressure from a line 13 which branches off line 5 and of the delivery pressure from line 11. The outlet pressure acts on an opposing control surface.

The discharge ends of proportioning pressure regulators 9 and 12 are connected to a changeover valve 14 from which a line 15 leads to a relay valve 16 of a stroke-volume control regulator 17 for pump 1 that is designed as a servo follower control. The relay valve 16 is operated by the pressures in control-pressure lines 18 and 19. A line 20 is connected to line 15 to carry actuating pressure to a stroke-volume control (not shown) of the motor.

A line 23 connects control-pressure line 18 to a pair of spring-loaded two-way valves 21 and 22 which are connected in parallel. Each two-way valve 21 and 22 has an open position and a closed position with the open position being controlled by the actuating pressure prevailing ahead of a control surface. A pressure-relief valve 24 with its outlet connected to a tank 25 is located downstream of two-way valve 22. The outlet of two-way valve 21 is also connected to tank 25.

In an analogous manner, a line 26 connects control-pressure line 19 to a pair or spring-loaded two-way valves 27 and 28 which are connected in parallel. Each two-way valve 27 and 28 has an open position and a closed position with the open position being controlled by the actuating pressure prevailing ahead of a control surface. A pressure-relief valve 29 with its outlet connected to tank 25 is located downstream of two-way valve 28. The outlet of the two-way valve 27 it also connected to tank 25.

The control surfaces of two-way valves 21 and 22, which are in the direction of flow, are connected to line 8, while the control surfaces of two-way valves 27 and 28, which are in the direction of flow, are connected to line 11.

The operation of the circuit is set forth hereinafter. A high pressure exists in one delivery-pressure line, for example, line 2, and a low pressure exists in the second delivery-pressure line 3. The pressure in line 3 is a feed pressure from booster pump 4. Thus, hydraulic fluid under feed pressure is delivered by pump 4 through line 5 and feed unit 7 into line 3. The delivery pressure in line 2 is transmitted through line 8 and proportioning pressure regulator 9 to reduce the delivery pressure. The outlet pressure from proportioning pressure regulator 9 is reduced proportionally to the delivery pressure at the intake the amount of reduction is determined by the area ratios of the opposite control surfaces. Proportioning pressure regulator 12 does not reduce the feed pressure from low-pressure line 3 so that the outlet pressure from regulator 12 equals the feed pressure.

The outlet pressures of proportioning pressure regulators 9 and 12 are passed to changeover valve 14 which, due to the higher pressure from the outlet of the proportioning pressure regulator 9, transmits same by line 15 to relay valve 16 where the outlet pressure of proportioning pressure regulator 9 functions as the actuating pressure. Depending upon the control pressure acting on relay valve 16 from the lines 18 and 19, the actuating pressure is passed on to stroke-volume control 17. The control 17 can have a compact design because the actuating pressure is higher than that in conventional low-pressure regulators.

Figure 2:
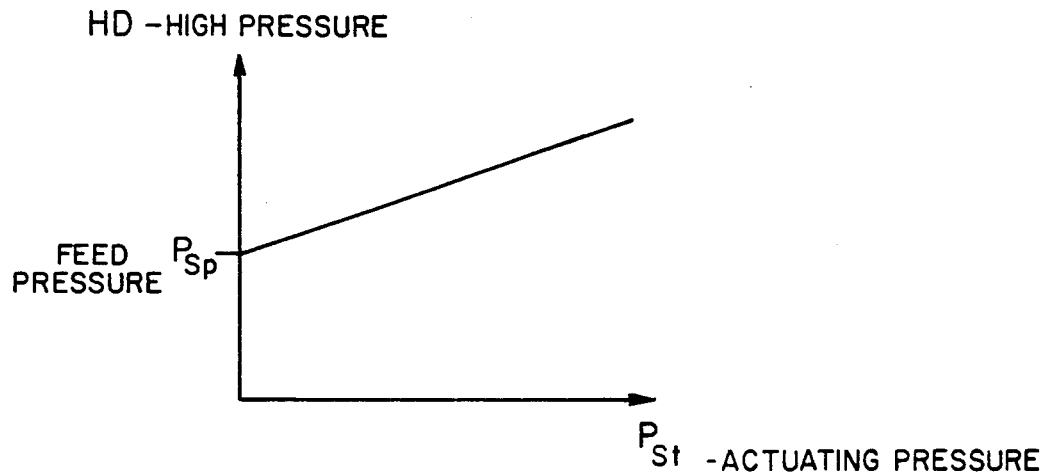
FIG. 2 is a regulating-pressure curve.

FIG. 2 of the drawings is a regulating-pressure curve illustrating the function of proportioning pressure regulator 9 (or in the case of transposed high-pressure ends, the function of proportioning pressure regulator 12). The actuating pressure $P_{st}$ is shown on the abscissa and the high pressure HD in the delivery-pressure line is shown on the ordinate. The minimum value of the actuating pressure is the level of the feed pressure $P_{sp}$ and it increases linearly as the high pressure increases. The slope of the curve is determined by the area ratio of the control surfaces of the proportioning pressure regulator which are acted upon by intake pressure in the opening direction and by outlet pressure in the closing direction.

The outlet pressure from the proportioning pressure regulator 9, i.e., the actuating pressure, is passed to the open direction control surface of the two-way valve 21. If the actuating pressure is sufficiently high, i.e., if the pressure in delivery-pressure line 2 reaches a certain value, the two-way valve 21 opens to release pressure from control-pressure line 18 so that relay valve 16 and stroke-volume control regulator 17 are adjusted to prevent the pressure in delivery-pressure line 2 from exceeding the limiting value. Thus, the function of the two-way valve 21 is to moderate the pressure.

The two-way valve 22 is connected in parallel with two-way valve 21 and functions in combination with pressure-relief valve 24 which is downstream of valve 22 to limit the output of pump 1. After opening two-way valve 22 by means of the actuating pressure acting on the control surface, due to the characteristic of pressure-relief valve 24, the control pressure from line 18 is reduced to such an extent that the stroke-volume regulation of pump 1 follows the performance hyperbola, i.e., the product derived from the delivery pressure and the delivery volume remains constant.. Analogously, when the high-pressure and the low-pressure ends are reversed, i.e., line 3 is the high-pressure line, the same functions are performed by valves 27, 28 and 29. Control of the valves with actuating pressure is less complicated than control with high pressure.

Figure 3:
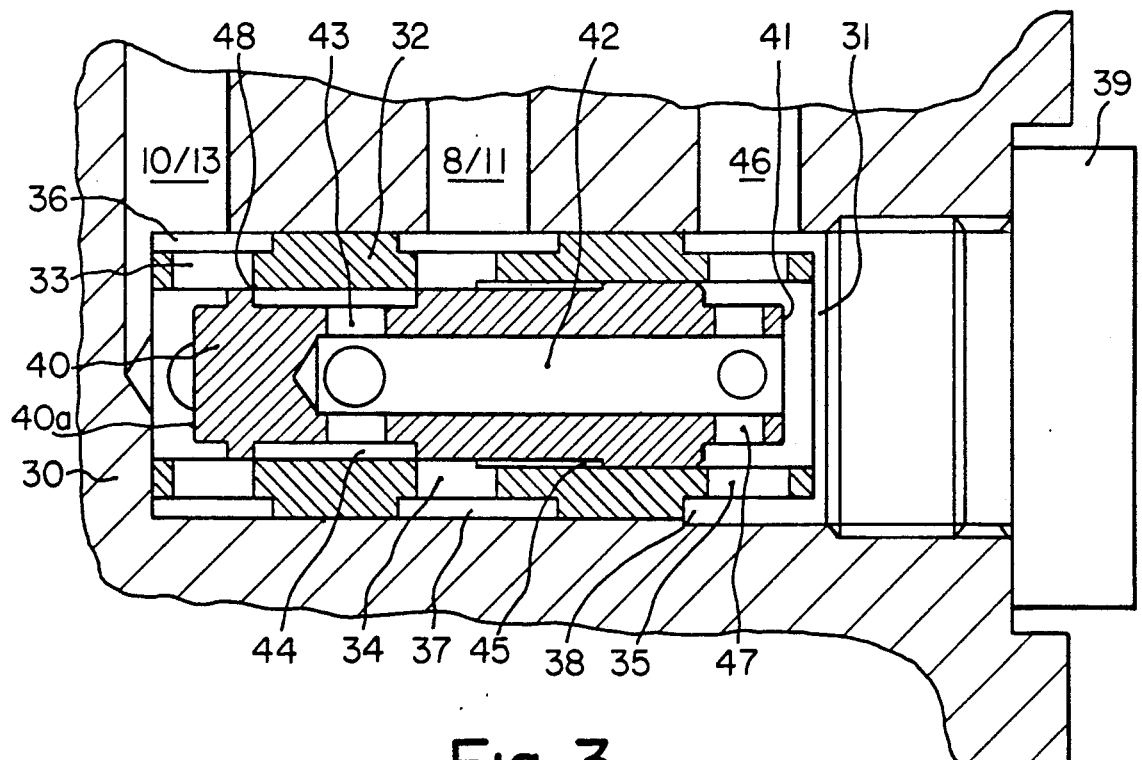
FIG. 3 is a sectional view of a proportioning pressure regulator according to the invention.

FIG. 3 of the drawings is a sectional view of a proportioning pressure regulator (9 or 12) that is located in the housing 30 of pump 1. The regulator has a fixed sleeve 32 located in a blind bore 31 which has radially extending bores 33 at the closed end; radially extending bores 34 midway of its length; and radially extending bores 35 at the open right end. The radially extending bores 33, 34 and 35 communicate respectively with annular slots 36, 37 and 38 located on the exterior of sleeve 31. The open end of bore 31 is closed by a threaded plug 39. A reciprocable piston 40 is located within sleeve 32 and a blind axial bore 42 extends from the open end 41 of the piston to the closed end. Radial bores 43 connect axial bore 42 with an annular slot 44 on the exterior of piston 40 at the closed end. The outside diameter of piston 40 is slightly enlarged near the open end and the inside diameter of sleeve 32 is slightly enlarged at the right end. The enlarged diameter of sleeve 32 extends into the radial bores 34. This results in an annular lip 45 at the outside diameter of piston 40.

The annular slot 36 is in communication with a channel that is a part of line 10 or line 13 as then in FIG. 1 of the drawings and receives feed pressure from the line. The annular slot 37 is in communication with a channel that is a part of line 8 or line 11, and the annular slot 38 is connected to a drainage channel 46 that leads to changeover valve 14. Radial bores 47 are formed adjacent to the open end of piston 40 and communicate with axial bore 42.

The closed end 40a of piston 40 is constantly connected with a feed pressure from one of lines 10 or 13 through the annular slot 36 and the radially extending bores 33 in sleeve 32. Consequently there is a force on end 40a which initially moves piston 40 toward threaded plug 39. When pump 1 is in a neutral position feed pressure prevails in line 8 or line 11 and hydraulic fluid under feed pressure flows to changeover valve 14 from the intake end of proportioning pressure regulator 9 or 12 through annular slots 37 and radially extending bores 34 in sleeve 32, through annular slot 44 and radial bores 43, through axial bore 42 and radial bores 47 in piston 40, through radially extending bores 35 and annular slot 38 in sleeve 32, and through drainage channel 46.

Hydraulic fluid acting upon the end 41 of piston 40 applies a force directed to the closed end of the piston (to the left as seen in FIG. 3). The force directed toward the open end of the piston (to the right as seen in FIG. 3) is comprised of the force acting upon the end 40a of piston 40 originating from the feed pressure and the force acting upon the annular lip 45 originating from the intake pressure, i.e., in a neutral position of pump 1. The forces originating from the feed pressure are counter to the force acting on the end 41 of piston 40. Because of the uniformity of area of the piston surfaces facing to the left and facing to the right and the resulting equality of forces at equal pressure throughout, namely feed pressure, piston 40 initially remains in the right displacement position with the result that channel 46 is in communication with either line 8 or line 11. Therefore, it is always guaranteed that at least the feed pressure is present as outlet pressure from the proportioning pressure regulator.

By adjusting the stroke volume of pump 1 the pressure in line 8 or in line 11 rises above the feed pressure and high pressure prevails and the force to the right increases which acts upon the annular lip 45. The force upon end 40a remains constant. Since the connection between the intake end and the outlet end of the proportioning pressure regulator remains open the pressure propagates undiminished. The force acting upon the end 41 of piston 40 also increases with the increase of the force on annular lip 45. But because the area of end 41 is larger than the area of annular lip 45 the force directed to the left is initially greater than the force directed to the right acting upon the annular lip 45 and upon end 40a. Therefore, piston 40 is moved to the left and continues to reduce the supply of hydraulic fluid to annular slot 44 until, as a result of the restriction of the oil supply and the pressure drop at end 41, the force directed to the left decreases and a new equilibrium of forces is established. The actuating pressure at the outlet of the proportioning pressure regulator is reduced to a level, as compared to the delivery pressure, that corresponds to the area ratio of annular lip 45 to end 41 plus the feed pressure prevailing at end 40a. For example, given a maximum delivery pressure of 400 bar and a feed pressure of 15 bar, the actuating pressure can be reduced to 1:10 ratio plus 15 bar feed pressure, i.e., to 55 bar. If the actuating pressure rises above the specified value for any reason, piston 40 is moved to the left until a control edge 48 opens and hydraulic fluid flows into line 10 or line 13, and the actuating pressure is reduced until the equilibrium of forces on the piston 40 is restored.

The foregoing describes a preferred embodiment of the invention and is given by way of example only. The invention is not limited to any of the specific features described herein, but includes all such variations thereof within the scope of the appended claims.

We claim:

1. A control device including a closed fluid circuit adapted to be connected to a variable displacement hydrostatic machine, two delivery lines in said circuit for connection to a hydrostatic machine, a main pump connected to said delivery lines, a stroke-volume regulator in said circuit responsive to an actuating pressure for controlling the operation of a variable displacement hydraulic machine, a booster pump in said circuit, a feed pressure line in said circuit connecting said booster pump to said delivery lines, actuating pressure lines in said circuit adapted to connect a variable displacement hydrostatic machine to said stroke-volume regulator whereby the fluid pressure in said circuit is the actuating pressure for said stroke-volume regulator if sufficient pressure is provided by a variable displacement hydrostatic machine connected to said circuit and said booster pump increases the actuating pressure supplied to said stroke-volume regulator if insufficient pressure supplied is provided by a variable displacement hydrostatic machine connected in said circuit, a proportioning pressure regulator located in each of said actuating-pressure lines, whereby each of said proportioning pressure regulators supplies an outlet pressure to adjust said stroke-volume regulator to reduce the delivery pressure to a hydrostatic machine connected to said circuit.

2. A control device as set forth in claim 1, wherein said proportioning pressure regulator includes a slidable piston having a first control surface in a direction to which outlet pressure can be applied to reduce intake pressure, second and third control surfaces facing in a direction opposite to said first control surface to which feed pressure and delivery pressure can be applied, whereby the level of the actuating pressure is determined by the sum of feed pressure and the product of the delivery pressure and the are ratio between said third control surface and said first control surface.

3. A control device as set forth in claim 1 including a relay valve, a spring-loaded two-way valve having an open position and a closed position located in a delivery-pressure line and connected in parallel with said relay valve, said spring-loaded two-way valve having a spring and a control surface upon which an actuating pressure can be applied opposite to the effective direction of the force of said spring, and a discharge tank in flow connection with said spring-loaded two-way valve, wherein said spring-loaded two-way valve is open if the actuating pressure is sufficient to overcome the force of said spring to connect said spring-loaded two-way valve to said discharge tank.

4. A control device as set forth in claim 2 including a relay valve, spring-loaded two-way valve having an open position and a closed position located in a delivery-pressure line and connected in parallel with said relay valve, said spring-loaded two-way valve having a spring and a control surface upon which an actuating pressure can be applied opposite to the effective direction of the force of said spring, and a discharge tank in flow connection with said spring-loaded two-way valve, wherein said spring-loaded two-way valve is open if the actuating pressure is sufficient to overcome the force of said spring to connect said spring-loaded two-way valve to said discharge tank.

5. A control device as set forth in claim 3, including a pressure-relief valve located downstream of said spring-loaded two-way valve.

6. A control device as set forth in claim 4, including a pressure-relief valve located downstream of said spring-loaded two-way valve.

7. A control device as set forth in claim 1 including a changeover valve located downstream of said proportioning pressure regulator and connected to said stroke-volume regulator.

8. A control device as set forth in claim 7 including a line from said changeover valve adapted to connect said changeover valve to a stroke-volume control for a hydrostatic machine located downstream from said changeover valve.

9. A control device as set forth in claim 7, wherein said proportioning pressure regulators are located within the housing of said hydrostatic machine.

10. A control device as set forth in claim 2 including a changeover valve located downstream of said proportioning pressure regulator and connected to said stroke-volume regulator.

11. A control device as set forth in claim 3 including a changeover valve located downstream of said proportioning pressure regulator and connected to said stroke-volume regulator.

12. A control device as set forth in claim 4 including a changeover valve located downstream of said proportioning pressure regulator and connected to said stroke-volume regulator 13. A control device as set forth in claim 5 including a changeover valve located downstream of said proportioning pressure regulator and connected to said stroke-volume regulator.

14. A control device as set forth in claim 6 including a changeover valve located downstream of said proportioning pressure regulator and connected to said stroke-volume regulator.

15. A control device for connection in a closed fluid circuit with a variable displacement hydrostatic machine, a stroke-volume regulator in said closed circuit responsive to an actuating pressure to control the operation of a hydrostatic machine, a main pump in said circuit, a booster pump in said circuit connected to said main pump, delivery lines in said circuit connected to said main pump for connecting said main pump to a hydrostatic machine, actuating pressure lines in said circuit connecting said main pump and said booster pump to said stroke-volume regulator, whereby the pressure provided by said main pump is the actuating pressure for said stroke-volume regulator if sufficient pressure is provided by a hydrostatic machine connected in said circuit and said booster pump increases the actuating pressure supplied to said stroke-volume regulator, if insufficient pressure is provided by a hydrostatic machine connected to said circuit, said control device further including control pressure lines in said circuit for connecting a hydrostatic machine and said stroke-volume regulator and a proportioning pressure regulator located in each of said actuating-pressure lines, whereby each of said proportioning pressure regulators has an outlet pressure proportionally reduced relative to the inlet pressure supplied to said stroke-volume regulator.

\* \* \* \* \*

UNITED STATES PATENT AND TRADEMARK OFFICE
CERTIFICATE OF CORRECTION

PATENT NO. : 5,046,926

DATED : September 10, 1991

INVENTOR(S) : Horst Deininger, Gustav Kleineisel and Rudolf Richter

It is certified that error appears in the above-identified patent and that said Letters Patent is hereby corrected as shown below:

Column 3 Line 18 after "FIG." insert --1--.

Column 3 Line 60 "or" should read --of--.

Column 3 Line 67 "it" should read --is--.

Column 4 Line 17 after "intake" insert --and--.

Column 4 Line 68 "constant.." should read --constant.--.

Column 5 Line 27 "then" should read --seen--.

Claim 1 Lines 56-57 Column 6 after "pressure" delete --supplied--.

Claim 2 Line 5 Column 7 "are" should read --area--.

Signed and Sealed this

Sixteenth Day of February, 1993

*Attest:*

STEPHEN G. KUNIN

*Attesting Officer*  Acting Commissioner of Patents and Trademarks